United States Patent [19]

Mack

[11] 3,791,285

[45] Feb. 12, 1974

[54] APPARATUS FOR MOLDING AND COOKING EGG PRODUCTS

[76] Inventor: Leeqett Mack, 641 49th St. N.E., Washington, D.C. 23451

[22] Filed: June 23, 1972

[21] Appl. No.: 265,581

Related U.S. Application Data

[63] Continuation of Ser. No. 19,350, March 13, 1970, abandoned.

[52] U.S. Cl. .................................. 99/419, 99/440
[51] Int. Cl. ...... A23p 1/00, A47j 43/18, A47j 43/20
[58] Field of Search ..... 99/419, 354, 382, 381, 383, 99/384, 426, 428, 439, 440, 441, 442, 447; 220/4; 17/1 S; 126/376, 377

[56] References Cited
UNITED STATES PATENTS

| D54,367 | 2/1920 | Bierbach | 99/440 UX |
| 211,859 | 2/1879 | Manley | 99/440 UX |
| 826,843 | 7/1906 | Gaillard | 99/440 UX |
| 1,063,609 | 6/1913 | Shaw et al. | 99/440 X |
| 2,222,112 | 11/1940 | Miller | 99/428 UX |
| 3,552,303 | 1/1971 | Parrish | 99/447 |

FOREIGN PATENTS OR APPLICATIONS 544,827   6/1956   Italy ...................................... 99/419

*Primary Examiner*—John Petrakes
*Assistant Examiner*—Arthur O. Henderson
*Attorney, Agent, or Firm*—Theodore Bishoff

[57] ABSTRACT

An egg product is formed by separating the raw egg white from the yoke and hard-boiling the white around a meat or other food center to produce an egg product which resembles a hard-boiled egg having the substitute yoke consisting of any desired food material. The apparatus includes a cup having a spike to support the substitute yoke and an opening at the top to permit the white of the egg to be poured therein, to surround the substitute yoke. The cup has the shape of an egg and when heated in a water bath produces the desired egg product.

4 Claims, 11 Drawing Figures

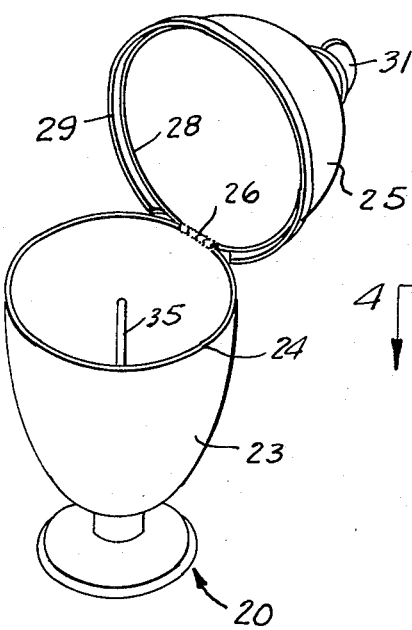
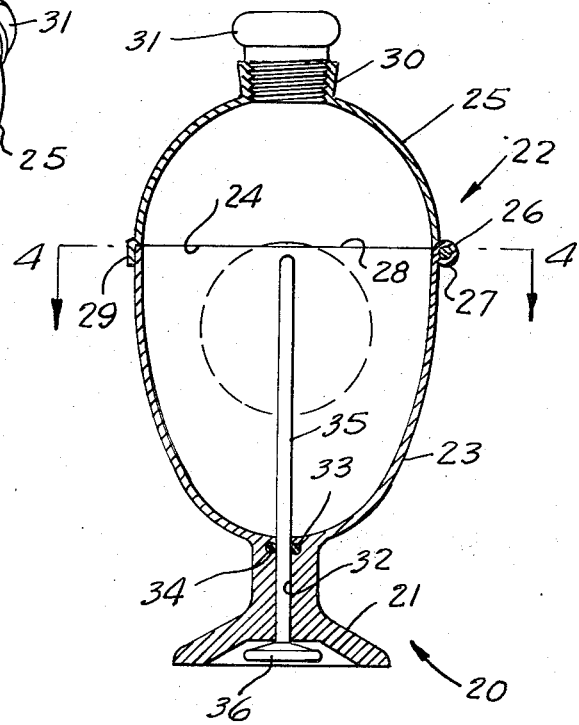
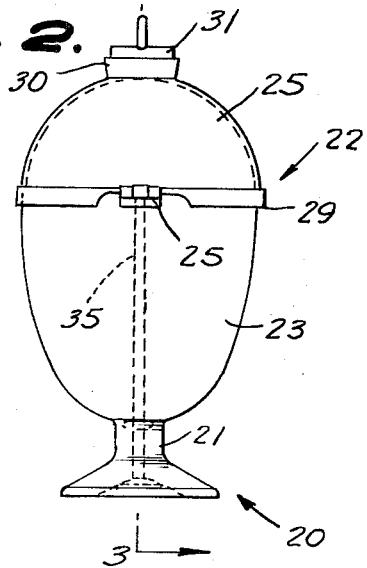
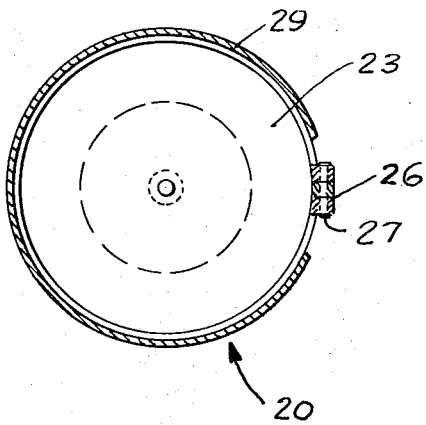

INVENTOR.
LEEGETT MACK,
BY
Berman, Davidson & Berman,
ATTORNEYS.

APPARATUS FOR MOLDING AND COOKING EGG PRODUCTS

This is a continuation of application Ser. No. 19,350, filed Mar. 13, 1970 now abandoned.

BACKGROUND OF THE INVENTION

Field of the Invention

The invention relates to the formation of an egg product having a substitute yoke.

SUMMARY OF THE INVENTION

The present invention is directed to the formation of an egg product having a substitute yoke in which the white of the egg is hard-boiled around a food material serving as a substitute yoke.

The primary object of the invention is to provide an egg product along with the method of and apparatus for forming same in which the egg product includes a food material as a substitute yoke and a hard-boiled white completely surrounding the substitute yoke.

Other objects and advantages will become apparent in the following specification when considered in the light of the attached drawings.

BRIEF DESCRIPTION OF THE DRAWINGS

FIG. 1 is a perspective view of the cup used in the practice of the present invention;

FIG. 2 is a rear elevation of the invention;

FIG. 3 is an enlarged vertical cross-section taken along the line 3—3 of FIG. 2 looking in the direction of the arrows;

FIG. 4 is a horizontal section taken along the line 4—4 of FIG. 3 looking in the direction of the arrows;

DESCRIPTION OF THE PREFERRED EMBODIMENT

Figure 5:
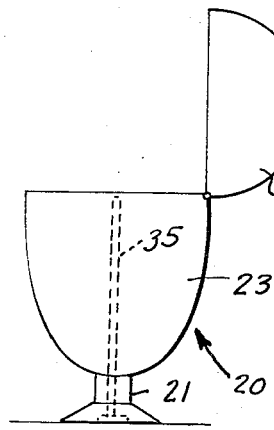
FIG. 5 is a side elevation of the cup illustrating step one of the method.
Figure 6:
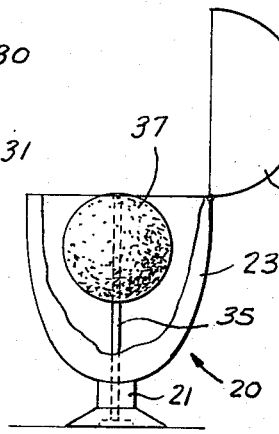
FIG. 6 is a view similar to FIG. 5 illustrating step two of the method.
Figure 7:
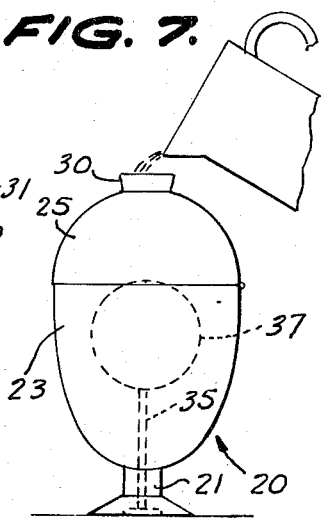
FIG. 7 is a side elevation of the cup in closed position illustrating step three of the method.
Figure 8:
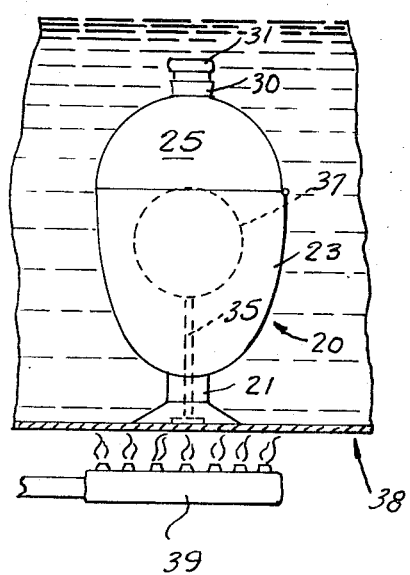
FIG. 8 is a side elevation of the cup during the hard-boiling step four of the method.
Figure 9:
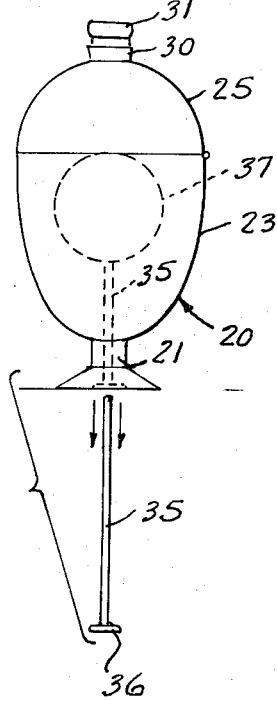
FIG. 9 is a side elevation of the cup illustrating step five of the method.
Figure 10:
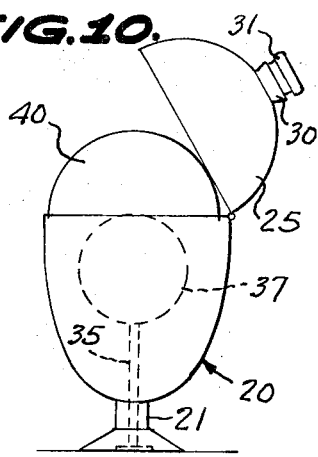
FIG. 10 is a side elevation of the cup illustrating step six of the method.
Figure 11:
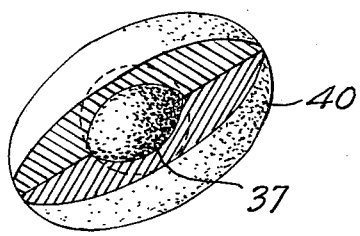
FIG. 11 is a perspective view of the egg product shown partially broken away and in section for convenience of illustration.

Referring now to the drawings in detail wherein like reference characters indicate like parts throughout the several figures the reference numeral 20 indicates generally an egg product forming cup constructed in accordance with the invention.

The cup 20 includes a pedestal base 21 having an egg shaped hollow container generally indicated at 22 mounted thereon. The egg shaped hollow container 22 includes a bottom portion 23 integrally mounted on the pedestal base 21 and having a generally horizontal upper edge 24. A cover portion 25 is connected by a hinge 26 to the lower portion 23 with the hinge 26 having a horizontal pintle 27.

The cover 25 has a generally horizontal lower edge 28 which meets the horizontal edge 24 of the lower portion 23. A flange 29 is integrally formed on the lower edge of the cover 25 to engage over the upper edge of the lower portion 23.

A filler neck 30 extends upwardly from the center of the top, of the cover 25 and is internally threaded to receive an externally threaded plug 31 removeably seated therein.

The pedestal base 21 has a vertical axial bore 32 extending upwardly therein and having an O ring seal 33 seated in an annular groove 34 at the upper end thereof. A spike 35 having a head 36 on its lower end extends upwardly through the bore 32 and is sealed by the O ring seal 33. The spike 35 has a height sligtly less than that of the lower portion 23 so that it terminates below the upper edge 24 thereof.

In practicing the method of the invention the cup 20 is opened in the position illustrated in FIG. 5 with the spike 35 projecting upwardly therein. A ball 37 of food material which may be any desired edible substance such as meats, cheeses, and the like is mounted on the spike 35 and the cover 25 is closed. The plug 31 is removed and raw egg white previously separated from the yokes is poured into the egg cup 20 through the filler neck 30 filling the egg cup 20. The plug 31 is then replaced and the egg cup 20 is placed in a water bath 38 heated by a gas burner 39. The egg white is hard-boiled in the water bath 38 and the cup 20 is then removed from the water bath 38. The spike 35 is grasped by the head 36 and withdrawn from the egg cup 20 following which the cover 25 is opened and the egg product 40 is removed therefrom.

The egg product 40 is then eaten in the manner of eating hard-boiled eggs.

It should be noted that the egg white may be seasoned as desired in the liquid stage prior to pouring into the egg cup for hard-boiling.

In following the above method, the egg yellow need not be wasted since it may obviously be mixed with mayonnaise, mustard, salt and pepper to prepare as deviled egg product which may be mounted on spike 35 and used as the yoke substitute in preparing the final product by the method described above. Alternatively the yoke may be blended with the white of the egg and poured into the cup 20 to surround the substitute yoke before the product is hard-boiled.

Having thus described the preferred embodiments of the invention it should be understood that numerous adaptations may be resulted to without departing from the spirit of the invention.

What is claimed is:

1. A mold for forming and cooking an egg product comprising an egg-shaped cup open at its upper end, a spike removably mounted in said cup and extending centrally upwardly therein and having its upper end terminating within said mold for supporting a substitute yolk centrally in said cup, a cover hingedly secured to said cup for closing the open upper end thereof and a closable filling neck integrally formed on said cover for filling said cup.

2. A mold as claimed in claim 1 wherein said cup has a bore extending through the bottom thereof and said spike extends upwardly through said bore and means in said bore for sealing said spike to said cup.

3. A mold as claimed in claim 1 including a support base secured to said cup with said spike extending through said support base.

4. A mold as claimed in claim 1, wherein said upper end of the spike terminates approximately in the plane of the upper end of said cup.

* * * * *